(12) United States Patent
Fahim et al.

(10) Patent No.: US 10,338,974 B2
(45) Date of Patent: Jul. 2, 2019

(54) VIRTUAL RETRY QUEUE

(71) Applicant: Intel Corporation, Santa Clara, CA (US)

(72) Inventors: Bahaa Fahim, San Clara, CA (US); Yen-Cheng Liu, Portland, OR (US); Jeffrey D. Chamberlain, Tracy, CA (US)

(73) Assignee: Intel Corporation, Santa Clara, CA (US)

( * ) Notice: Subject to any disclaimer, the term of this patent is extended or adjusted under 35 U.S.C. 154(b) by 253 days.

(21) Appl. No.: 14/126,875

(22) PCT Filed: Nov. 6, 2013

(86) PCT No.: PCT/US2013/068734
§ 371 (c)(1),
(2) Date: Dec. 17, 2013

(87) PCT Pub. No.: WO2015/069235
PCT Pub. Date: May 14, 2015

(65) Prior Publication Data
US 2015/0128142 A1    May 7, 2015

(51) Int. Cl.
*G06F 9/46* (2006.01)
*G06F 9/52* (2006.01)
*G06F 9/48* (2006.01)

(52) U.S. Cl.
CPC .............. *G06F 9/52* (2013.01); *G06F 9/4881* (2013.01)

(58) Field of Classification Search
CPC ........ G06F 9/466; G06F 9/4881; G06F 9/546; G06F 9/52
See application file for complete search history.

(56) References Cited

U.S. PATENT DOCUMENTS

| | | | | |
|---|---|---|---|---|
| 8,626,968 B2 * | 1/2014 | Vash | ................... | G06F 13/1642 710/15 |
| 8,756,349 B2 * | 6/2014 | Vash | ................... | G06F 13/1642 710/2 |
| 8,867,559 B2 * | 10/2014 | Dai | ..................... | H04L 47/6215 370/414 |
| 9,058,206 B2 * | 6/2015 | Avni | ..................... | G06F 9/4881 |
| 9,128,754 B2 * | 9/2015 | Shankar | ................ | G06F 9/4843 |
| 2002/0138670 A1 * | 9/2002 | Johnson | .................. | G06F 13/20 710/6 |
| 2004/0059858 A1 * | 3/2004 | Blankenship | ....... | G06F 13/4036 710/305 |

(Continued)

FOREIGN PATENT DOCUMENTS

CN    1641605 A    7/2005

OTHER PUBLICATIONS

PCT International Search Report and Written Opinion in PCT International Application Serial No. PCT/US2013/068734 dated Aug. 7, 2014 (7 pages).

(Continued)

*Primary Examiner* — Van H Nguyen
(74) *Attorney, Agent, or Firm* — Alliance IP, LLC

(57) ABSTRACT

A starvation mode is entered and a particular dependency of a first request in a retry queue is identified. The particular dependency is determined to be acquired and the first request is retried based on acquisition of the particular dependency.

28 Claims, 8 Drawing Sheets

(56) References Cited

U.S. PATENT DOCUMENTS

| | | | |
|---|---|---|---|
| 2005/0030963 | A1 | 2/2005 | Solomon et al. |
| 2007/0288937 | A1 | 12/2007 | Durojaiye et al. |
| 2009/0198893 | A1* | 8/2009 | Sorgard .............. G06F 12/1027 711/118 |
| 2010/0095036 | A1 | 4/2010 | Mittal et al. |
| 2011/0161601 | A1 | 6/2011 | Vash et al. |
| 2011/0161705 | A1 | 6/2011 | Vash et al. |
| 2012/0011283 | A1 | 1/2012 | Freking et al. |
| 2012/0036509 | A1 | 2/2012 | Srinivasan et al. |
| 2013/0111084 | A1* | 5/2013 | Wang .................... H04L 47/624 710/54 |

OTHER PUBLICATIONS

PCT International Report on Patentability and Written Opinion in PCT International Application Serial No. PCT/US2013/068734 dated May 10, 2016.

European Patent Office; Office Action for European Patent Application No. EP13897119.7, dated Nov. 23, 2018.

First Office Action and Search Report for Chinese Patent Application No. CN201380080097.5, dated Dec. 4, 2017, 17 pages—English Translation not Available.

International Preliminary Report on Patentability for Application No. PCT/US2013/068734, dated May 19, 2016, 6 Pages.

Notice of Allowance for Korean Patent Application No. KR20167008971, dated May 31, 2017, 4 pages—English Translation Available.

Second Office Action and Search Report for Chinese Patent Application No. CN201380080097.5, dated Jul. 24, 2018, 21 pages—English Translation not Available.

European Patent Office Supplementary European Search Report in European Application No. 13897119 dated May 23, 2017, 9 pages.

Korean Notice of Preliminary Rejection in Korean Application No. 2016-7008971 dated Jan. 11, 2017, 11 pages.

Third Office Action for Chinese Patent Application No. CN201380080097, dated Jan. 21, 2019, 3 Pages—English Translation not Available.

* cited by examiner

VIRTUAL RETRY QUEUE

FIELD

This disclosure pertains to computing systems, and in particular (but not exclusively) coherence control in computing systems.

BACKGROUND

Processor chips have evolved significantly in recent decades. The advent of multi-core chips has enabled parallel computing and other functionality within computing devices including personal computers and servers. Processors were originally developed with only one core. Each core can be an independent central processing unit (CPU) capable of reading executing program instructions. Dual-, quad-, and even hexa-core processors have been developed for personal computing devices, while high performance server chips have been developed with upwards of ten, twenty, and more cores. Cores can be interconnected along with other on-chip components utilizing an on-chip interconnect of wire conductors or other transmission media. Scaling the number of cores on a chip can challenge chip designers seeking to facilitate high-speed interconnection of the cores. A variety of interconnect architectures have been developed including ring bus interconnect architectures, among other examples.

Computing devices can utilize interconnect architectures such as Peripheral Component Interconnect (PCI) Express (PCIe), to facilitate intercommunication between components on the device. An interconnect architecture can use credit-based flow control and other flow control rules to manage "fair" access and usage by the various component of the device to resources of the device. As components compete for resources, access of one component to the resources can suffer due to this competition or other factors. For instance, deadlock or livelock conditions can occur resulting in resource starvation of the deprived component. The same device is also able to issue responses to transactions for which it is the target in a timely manner. Internal starvation mechanisms have been developed for handling instance where a request or response of a component of a computing device fails to make forward progress. Forward progress in this context relates to a component's ability to issue transaction requests (or completion responses) and have them completed (or successfully delivered) in a timely manner. Forward progress can be stalled for a variety of reasons, such as when a device does not have flow control credits to successfully issue packets onto the link, among other examples.

BRIEF DESCRIPTION OF THE DRAWINGS

Like reference numbers and designations in the various drawings indicate like elements.

DETAILED DESCRIPTION

Figure 1:
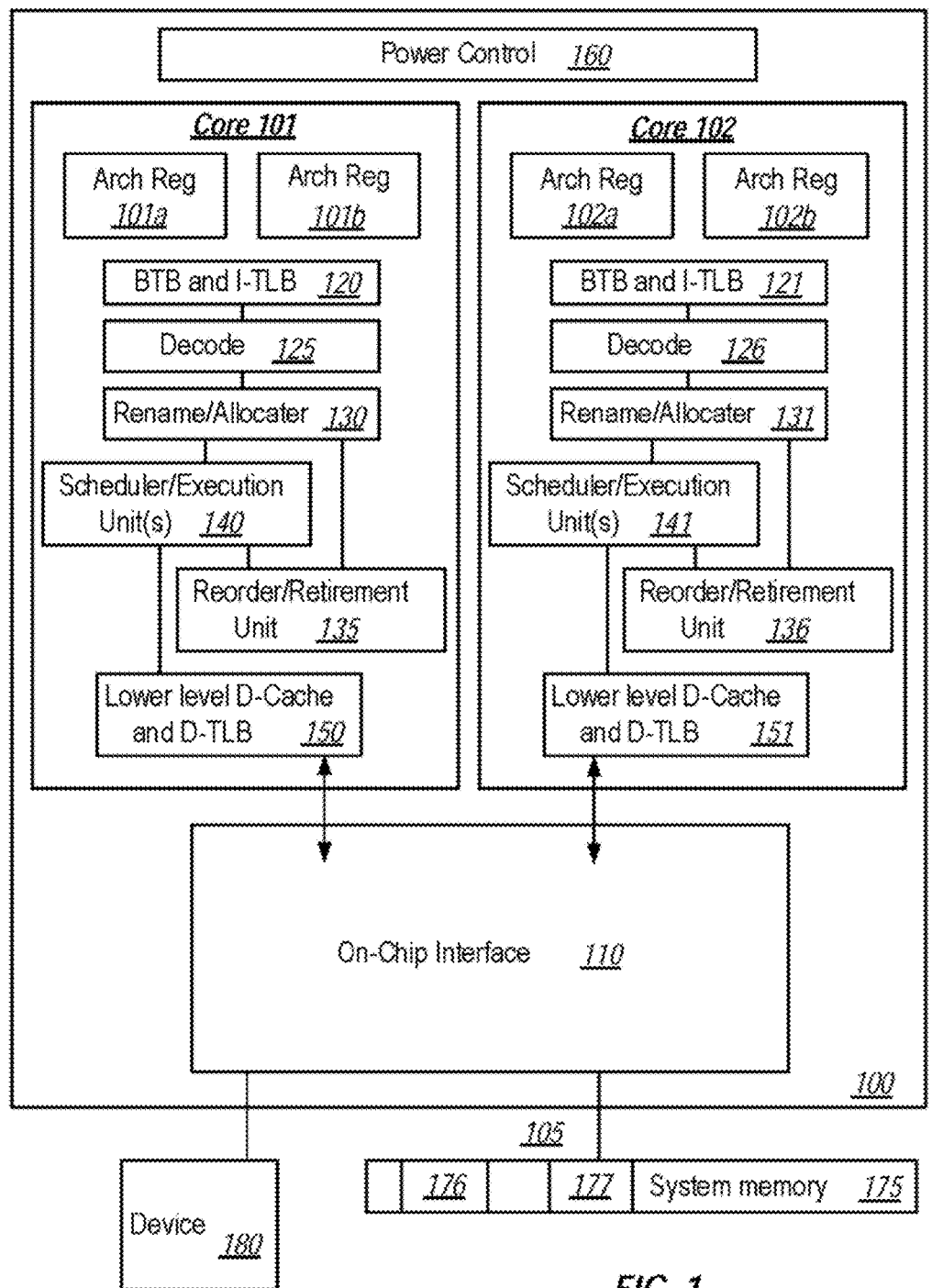
FIG. 1 illustrates an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 can be considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In cores 101, 102, other smaller resources, such as instruction pointers and renaming logic in allocator and renamer block 130, 131 may also be replicated for threads 101a and 101b and 102a and 102, respectively. Some resources, such as re-order buffers in reorder/retirement unit 135, 136, ILTB 120, 121, load/store buffers, and queues may be shared through partitioning. Other resources, such as general purpose internal registers, page-table base register(s), low-level data-cache and data-TLB 150, 151 execution unit(s) 140, 141 and portions of out-of-order unit are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit to decode fetched elements. Fetch logic, in one embodiment, includes individual sequencers associated with thread slots 101a, 101b, respectively. Usually core 101 is associated with a first ISA, which defines/specifics instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Example interconnect fabrics and protocols can include such examples a Peripheral Component Interconnect (PCI) Express (PCIe) architecture, Intel QuickPath Interconnect (QPI) architecture, Mobile Industry Processor Interface (MIPI), among others. A range of supported processors may be reached through use of multiple domains or other interconnects between node controllers.

An interconnect fabric architecture can include a definition of a layered protocol architecture. In one embodiment, protocol layers (coherent, non-coherent, and optionally other memory based protocols), a routing layer, a link layer, and a physical layer can be provided. Furthermore, the interconnect can include enhancements related to power managers, design for test and debug (DFT), fault handling, registers, security, etc.

The physical layer of an interconnect fabric, in one embodiment, can be responsible for the fast transfer of information on the physical medium (electrical or optical etc.). The physical link is point to point between two Link layer entities. The Link layer can abstract the Physical layer from the upper layers and provide the capability to reliably transfer data (as well as requests) and manage flow control between two directly connected entities. It also is responsible for virtualizing the physical channel into multiple virtual channels and message classes. The Protocol layer can rely on the Link layer to map protocol messages into the appropriate message classes and virtual channels before handing them to the Physical layer for transfer across the physical links. Link layer may support multiple messages, such as a request, snoop, response, writeback, non-coherent data, etc.

In some implementations, a Link layer can utilize a credit scheme for flow control. Non-credited flows can also be supported. With regard to credited flows, during initialization, a sender is given a set number of credits to send packets or flits to a receiver. Whenever a packet or flit is sent to the receiver, the sender decrements its credit counters by one credit which represents either a packet or a flit, depending on the type of virtual network being used. Whenever a buffer is freed at the receiver, a credit is returned back to the sender for that buffer type. When the sender's credits for a given channel have been exhausted, in one embodiment, it stops sending any flits in that channel. Essentially, credits are returned after the receiver has consumed the information and freed the appropriate buffers.

In one embodiment, routing layer can provide a flexible and distributed way to route packets from a source to a destination. In some platform types (for example, uniprocessor and dual processor systems), this layer may not be explicit but could be part of the Link layer; in such a case, this layer is optional. It relies on the virtual network and message class abstraction provided by the Link Layer as part of the function to determine how to route the packets. The routing function, in one implementation, is defined through implementation specific routing tables. Such a definition allows a variety of usage models.

In one embodiment, protocol layer can implement the communication protocols, ordering rule, and coherency maintenance, I/O, interrupts, and other higher-level communication. Note that protocol layer, in one implementation, can provide messages to negotiate power states for components and the system. As a potential addition, physical layer may also independently or in conjunction set power states of the individual links.

Multiple agents may be connected to an interconnect architecture, such as a home agent (orders requests to memory), caching (issues requests to coherent memory and responds to snoops), configuration (deals with configuration transactions), interrupt (processes interrupts), legacy (deals with legacy transactions), non-coherent (deals with non-coherent transactions), and others.

Traditional cache box ("cbox") designs have employed retry-based micro-architectures that are prone to a variety of livelock/deadlock conditions. Such traditional retry-based designs typically provide for both low latency accesses to snoop filter/last level cache ("LLC"), and efficient use of credits/resources since requests enter the TOR pipeline without prior knowledge of which credits or dependencies exist for the current request. However, such designs can introduces numerous access fairness issues. For example, one request waiting for a credit may continuously lose the credits it is waiting on to one or more other requests which enter the pipeline while the starved request is being retried. Some traditional anti-starvation schemes attempt to address this issue through an internal starvation and external starvation mechanism. Such internal starvation mechanisms can provide a capability to resolve starvation issues resulting from different requests within the same flow control class starving each other. For instance, requests may be speculatively dispatched to the pipeline (e.g., table of requests (TOR), snoop filter, LLC pipeline) without waiting for an ACK/NACK decision. The ACK/NACK decision may take many clocks (due to dependency on LLC/SF lookup result, as well as pipeline/credit conditions, etc.) and waiting for the ACK/NACK can diminish the available bandwidth of the pipeline and TOR. In some cases, this can result in younger requests making progress while an older request is not.

External starvation mechanisms can provide functionality for resolving forward progress issues due to requests from different ingress queues competing for the same resources. In traditional external starvation mechanism solutions, a queue that is starved can cause all other queues that might be competing for the same resource to be blocked. This can cause further issues in some cases however, as some of these competing queues may be needed to allow the waited-for credit to be made available, making the blocking of these competing queues counterproductive to resolving the starved queue. Dependency rules can indicate which queues are to block which other queues and under what conditions. Some of these dependency rules can be strongly tied to the interconnect and other protocol dependency rules and microarchitecture. Such rules can be extremely difficult to formally prove or validate in pre-silicon in some cases.

Pre-silicon validation has historically been challenged to expose deadlock/livelock bugs in pre-silicon simulations, for instance, because of test time limitations in creating the deadlock/livelock scenario. For instance, traditional external starvation mechanisms, in some examples, do not have a specific upper bound on the number of retries that are acceptable for each request, making the detection of deadlock/livelock difficult if not impossible in some instances.

A system can be provided with intellectual property (IP) blocks (or "blocks") that employ cbox and/or home agent logic capable of addressing at least some of the issues above, including deadlock/livelock difficulties, among other example advantages. For instance, combined cbox-home agent ("CHA") logic can be provided to create a dependency chain for requests, responses, or other entries that are having difficulty making progress and distribute credits to entries which are not making progress based on priority. This can further be accomplished without having one queue (i.e., with the request being retried) block another. An improved retry queue solution can also be provided with an upper bound of the number of retries. Further, virtual retry queues can be maintained for each one of a plurality of flow control classes and entries. In some implementations, entries within each of these virtual queues can be processed in a first-in first-out (FIFO) order and retries of entries within the virtual queue can be held until a dependency of the entry has been resolved or acquired (referred to herein collectively as "acquiring" the dependency). Between the queues, entries are not blocked unless these are is a dependency conflict. Such solutions, among other example advantages, can improve pre-silicon verification of forward progress performance as well as improve power efficiency by reducing the activity factor as entries wait in the retry queue and acquire a credit without continuously burning power through indiscriminate retries. Further, such solutions can be readily scalable to future designs and are adaptable to multiple different microarchitecture or coherence protocols.

Figure 2:
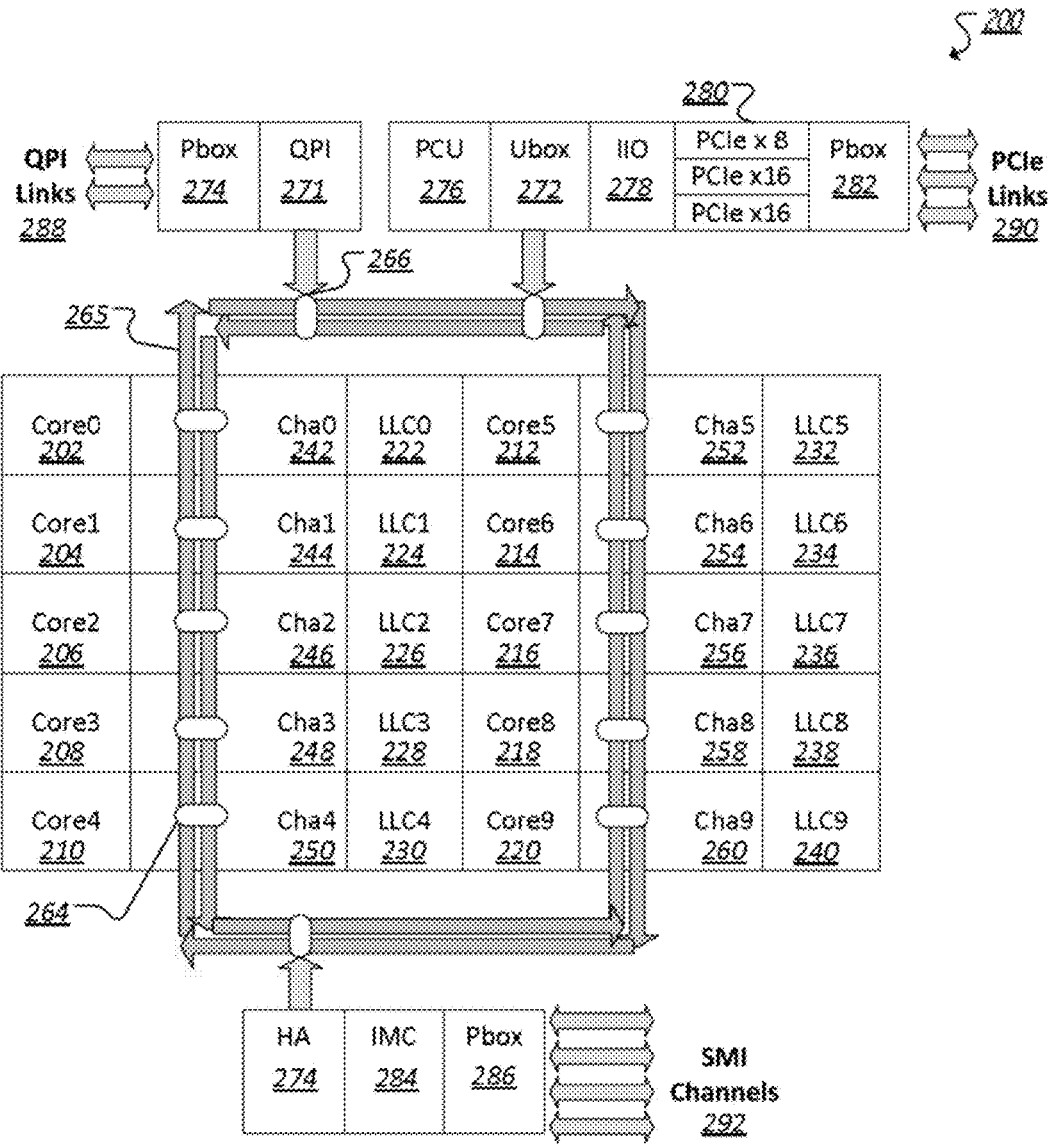
FIG. 2 illustrates a block diagram of a multi-core system including an interconnect.

Systems can be provided, such as those similar to those shown and described in the examples below, that incorporate principles such as those introduced above. Turning, for instance, to the example illustrated in the simplified block diagram of FIG. 2, a system 200 is shown including a plurality of IP blocks, or blocks, each including one of a plurality of processor cores (e.g., 202, 204, 206, 208, 210, 212, 214, 216, 218, 220) and corresponding cache banks (e.g., of a last level cache (LLC)) (e.g., 222, 224, 226, 228, 230, 232, 234, 236, 238, 240). Each file can further include logic for managing interactions of the cores (e.g., 202, 204, 206, 208, 210, 212, 214, 216, 218, 220) with one or more of the cache banks (e.g., 222, 224, 226, 228, 230, 232, 234, 236, 238, 240). For instance, each file can include cache box logic, core box logic, home agent logic, or combinations of the foregoing (collectively referred to herein as "CHA logic") (e.g., 242, 244, 246, 248, 250, 252, 254, 256, 258, 260) to interface a core with a system cache (e.g., LLC) and provide functionality for use in connection with requests and responses from cores (or other components) involving cache records and other resources. Such functionality can include logic for determining a cache bank corresponding to a requested cache record, sending a request to a cache agent (e.g., on a corresponding cache box), determining a path for sending the request, performing cache coherency, among other example functionality. Each file or unit can further include a respective interconnect interface (e.g., 264, 266) interfacing the unit (and component core, cache bank, etc.) with the interconnect 265. CHA logic can interface with, or in some cases, incorporate a corresponding interconnect interface (e.g., 264, 266).

An interconnect (e.g., 265) can be provided adopting any one of a potentially limitless variety of system layouts, architectures, or floor plans to connect potentially any combination of components that can be included, for instance, in a system on chip (SOC), microserver, or other system. The example of FIG. 2 should be appreciated as but one simplified example of such as a system. Components other than a core-cache tile or similar component (e.g., 271, 272, 274), such as memory controllers and external interface components such as PCIe, QPI, or other interconnect components can interface over the interconnect (e.g., 265) and further provide access to other channels (e.g., 274, 276, 278, 280, 282, 284, 286, 288, 290, 292) and resources of the system.

Figure 3:
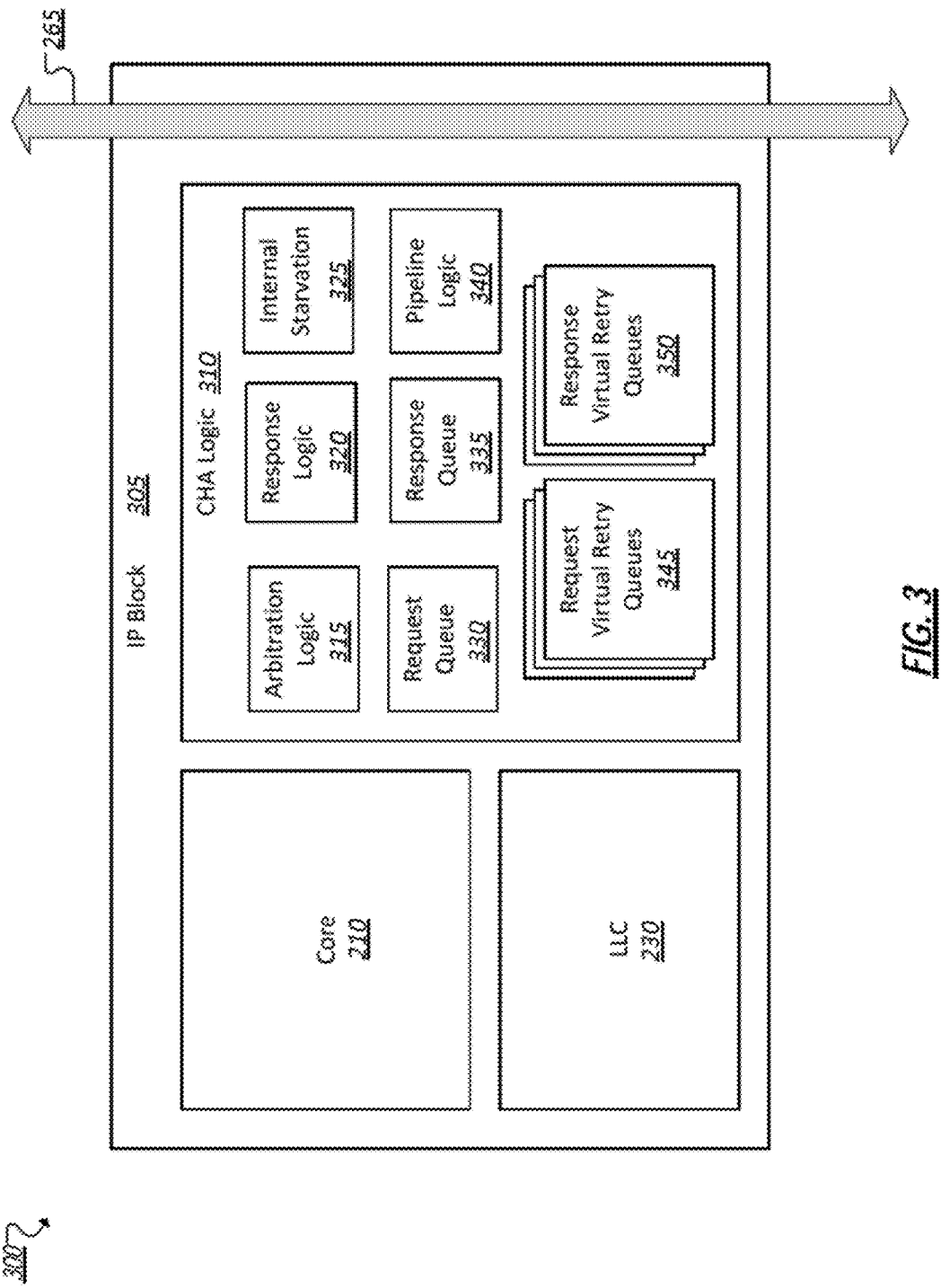
FIG. 3 illustrates a block diagram of an example system block including logic enabling features of at least one virtual retry queue.

Turning to the example of FIG. 3, a simplified block diagram 300 is shown illustrating example subcomponents of an example system block 305, such as a block including a processor core 210 and LLC bank 230 and supporting CHA logic 310. In the particular example of FIG. 3, CHA logic 310 can include arbitration logic, responses logic, internal starvation logic request queue logic, response queue logic, pipeline logic, among other executable software- and/or hardware-based logic including logic supporting request virtual retry queues and response virtual retry queues. CHA logic 310 can be provided for handling requests, responses (e.g., requests or completions responsive to received requests). Requests can be received from the same or another block of the system communicating the request over interconnect 265, or another component, including external components seeking, for instance, a record from the cache. Response logic 320 can handle and process incoming requests. Response logic 320, in some cases, can generate additional requests, such as requests to cache 230 or other resources to obtain information to properly respond to received requests. Pipeline logic 340 can include additional logic for processing received requests and other messages, including messages indicating that a particular outgoing request is not making forward progress. Such messages can also include an indication of dependencies, or reasons the request is not making forward progress within the system. Pipeline logic 340 can further include, in some instances, a system address decoder (SAD) to interpret addressing of incoming requests as well as determine whether the records requested in a request are present at the cache bank 230 of the block 305. SAD logic can determine that a requested record is not, in fact, present at the particular cache bank 230 and, in response, can be used to prompt response requests to attempt to identify an alternative location of the record, such as in another cache bank or in system memory, among other examples. Pipeline logic 340 can further provide, in some instances, cache coherency management involving the cache bank 230. Response logic 320 can interface with pipeline logic 340 to generate responses to received requests. In some cases, responses can include messages generated in response to an incoming request and include data returned from the cache bank 230 (e.g., where the requested record is present on the cache bank), coherency messages, messages indicating a "miss" (i.e., when the requested record is not present on the cache bank), messages pointing to another location in cache or memory where the record might be found, ACK/NACK messages, among other examples.

Responses generated using CHA logic 310 can be prepared for sending on the interconnect 265 through the use of egress logic of the CHA. Egress logic can identify a destination of the response and determine a path on the interconnect 265 to send the response to the destination. A look-up table or other data and logic can be used to determine a path that is most appropriate for the response. Arbitration logic 315 can be provided for arbitrating the sending of data on the interconnect 265. Messages to be sent by the cache box logic or core box logic can be queued in some instance, for example, when there is other higher-priority traffic on or about to be injected onto the interconnect 265. Accordingly, multiple queues (e.g., 330, 335) can be maintained and managed using arbitration logic 315 to govern the order in which competing requests and responses are injected onto the pipeline of interconnect 265. In some cases, separate queues (e.g., 330, 335) and supporting logic can be provided for each of a plurality of different flow control classes defined within the system, among other examples. Further, queuing and arbitration logic can further support retries of requests and responses that do not make forward progress. Internal starvation logic 325 can monitor retries involving one or more queues to guard against deadlock and/or livelock conditions involving requests and responses of the queues. Internal starvation logic 325 can be configurable to place all or a portion of block 305 into a starvation mode state. During the starvation mode state, virtual retry queues 345, 350 can be utilized to address one or more requests or responses that are failing to make forward progress and are expending pipeline bandwidth through multiple, repeated retries utilizing traditional retry techniques. Virtual retry queues 345, 350 can obtain and track dependencies of the requests/responses that are failing to make forward progress and can time subsequent retries with the acquiring of one or more dependencies causing the stalled forward progress.

Figure 4:
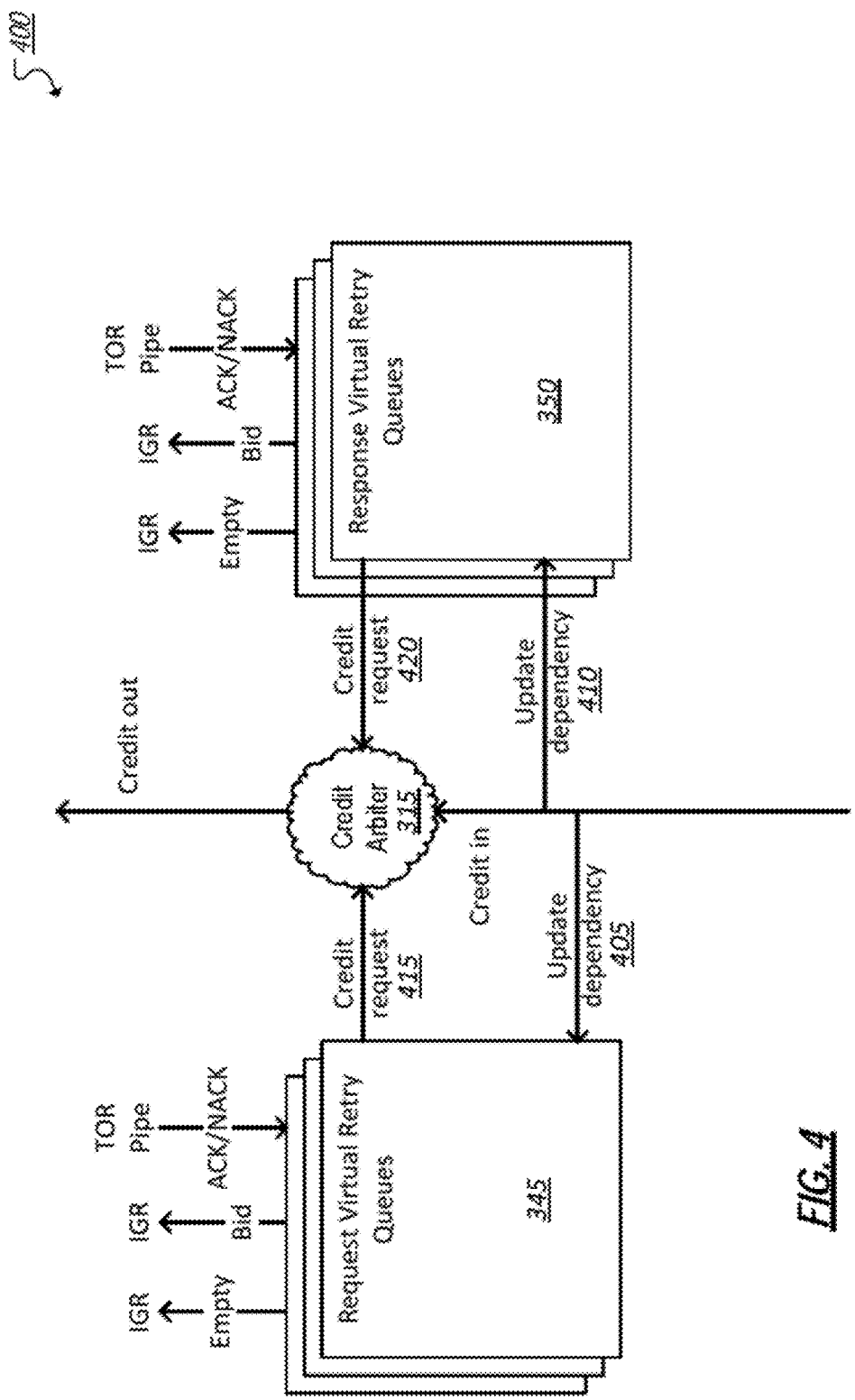
FIG. 4 illustrates a block diagram representing example request virtual retry queues and response virtual retry queues of an example system block.

Turning to FIG. 4, a simplified block diagram 400 is shown illustrating example messaging involving request virtual retry queues 345 and response virtual retry queues 350 of a particular IP block (e.g., 305). In some implementations, a separate request virtual retry queue 345 and response virtual retry queue 350 can be maintained for each respective flow control class supported by the block. Flow control classes for requests can include, as examples, classes corresponding core requests (IRQ), PCIe requests (PRQ), remote probes/snoops (IPQ), remote requests (RRQ), remote writebacks (EWB), among other examples. When in starvation mode, a virtual queue (e.g., 345, 350) can be used to queue requests (or responses) that are to be retried. In some implementations, separate virtual retry queues can be maintained for each flow control class and starvation mode can be entered specifically for that flow control class. During starvation mode, all other retries, for instance, for the corresponding flow control class, can be halted and queued using the corresponding virtual queue. Dependencies of one or more of the requests in the virtual queue can be determined and upon acquiring the dependency, such as a credit to a particular resource, the request at the top of the virtual queue can be retried. If forward progress is restored, other requests that are to be retried can have their corresponding dependencies acquired before retrying the requests, until forward progress is restored for all requests in the virtual queue. When the virtual queue is cleared, the system can exit from starvation mode.

A queue can be virtual, in the sense that it is implemented as a table of pointers to requests/responses in the actual queue (e.g., 330, 335). The virtual queue can be implemented to override the order of the actual queue while the system is in starvation mode. For instance, a virtual retry queue can point to actual FIFO queue entries. Providing for virtual retry queues can, among other example advantages, significantly reduce complexity, area overhead, among other examples.

In the example of FIG. 4, dependency information in the form of dependency updates 405, 410 can be obtained from the pipeline and tracked by request virtual retry queue 345 and response virtual retry queue 350. As dependencies are acquired, queue requests in the virtual queues can be retried. In some instances, a retry can still result in stalled progress. In such instances, the dependency of the request can be updated to account for the most recent failure to obtain forward progress. When the updated dependency is acquired, the request can be retried again, and so on until forward progress is obtained. In some cases, acquiring a dependency of the request can include identifying the dependency and then attempting to obtain the dependency. For instance, in the case of a dependency in the form of a credit for a particular resource, virtual retry queue logic can cause a corresponding credit request to be made in an attempt to acquire the dependency. Other dependencies can include, for example, dependence on other outstanding requests' completion and the retry queue can be used to monitor the outstanding requests and retries and retry the pending request when that outstanding request has completed, among other example dependencies.

In some cases, multiple virtual queues can compete for the same dependency. In other words, two or more different requests (and/or responses) within separate virtual queues can be waiting on the same dependency. When the dependency is acquired, it may be effectively acquired for multiple virtual queues at once. A credit arbiter or other arbitration logic can mediate such dependency conflicts such that a retry in one of the competing virtual queues is designated as the subordinate request and waits on the retry in another of the competing virtual queues. Waiting on the retry of another request (or response) having the same dependency can itself be a dependency. In some cases, the dependency of the competing subordinate request can be updated such that identification of the retry, or forward progress, of the competing request triggers the retry of the subordinate request.

As shown in FIG. 4, both request and response virtual retry queues (e.g., 345, 350) can generate and send additional messages. For instance, virtual retry queues can ingress (ING) messages such as an Empty message indicating that the corresponding retry queue is empty, and Bid messages indicating that the retry queue is bidding for the pipeline access in order to retry a request that is pending, among other examples. Acknowledgement (ACK/NACK) messages can also be received or otherwise monitored with acknowledgements indicating whether a message or its retry were successful or not. Corresponding dependency information can be obtained for messages from such acknowledgement messages.

Figure 5:
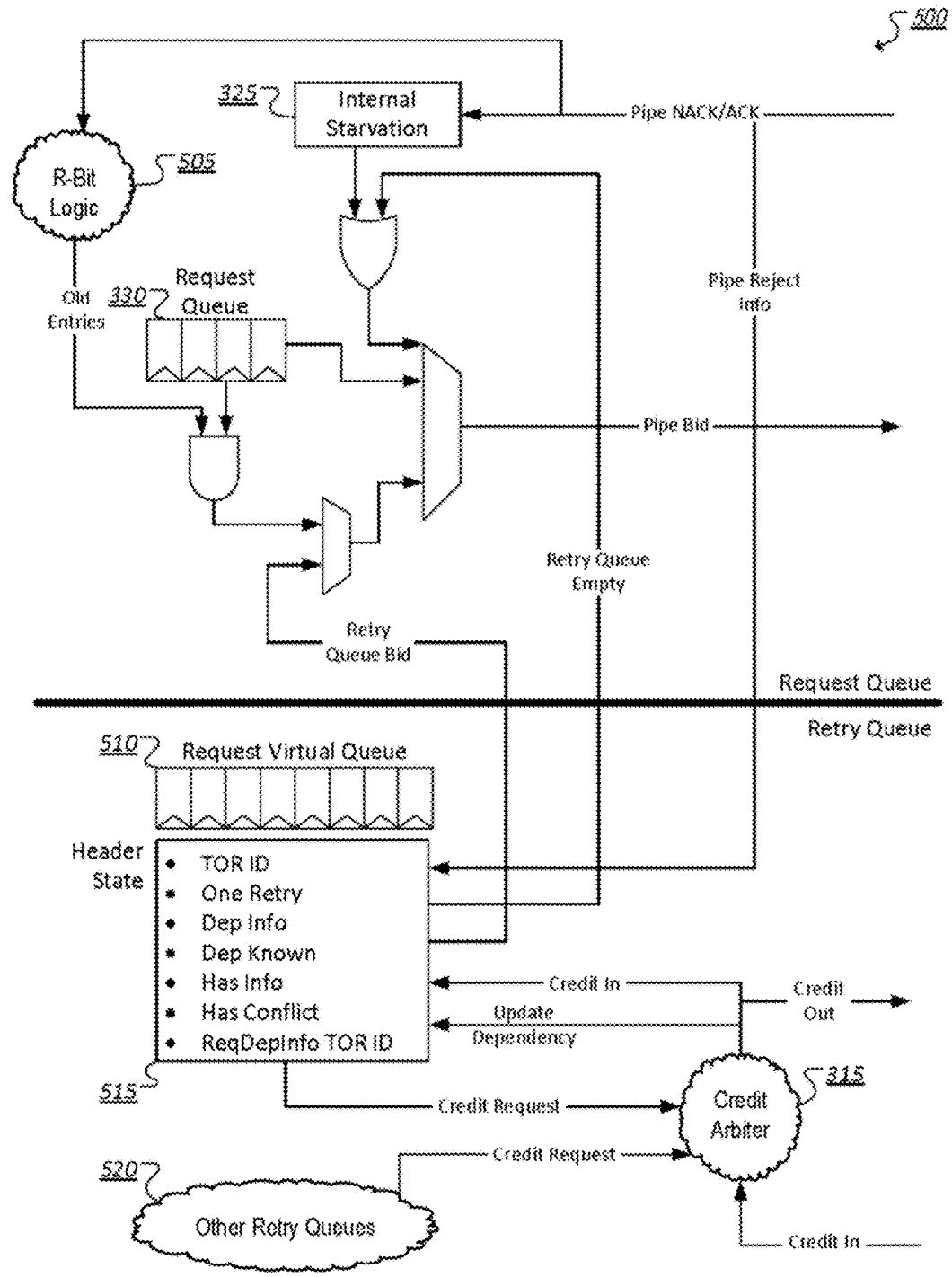
FIG. 5 illustrates a block diagram representing an example request virtual retry queue.

Turning to FIG. 5, a simplified block diagram 500 is shown illustrating details of an example implementation of a request virtual retry queue. In some implementations, when the system is not in starvation mode, forward progress can be monitored for requests sent by a corresponding system block onto the pipeline. As requests are generated (e.g., using R-bit logic 505), they can be queued in request queue 330. ACKs and NACKs corresponding to the requests can be monitored by internal starvation logic 325 to determine whether forward progress is being made by the requests. During normal operation (e.g., when not in starvation mode), a failed request can be retried and may be continued to be retried multiple times in an attempt to realize forward progress of the request. In some implementations, internal starvation logic 325 can maintain counters of the number of retries for each request that is held up and not realizing forward progress. When a first of the retried requests meets a certain threshold of retries without forward progress, the internal starvation logic 325 can cause the queue to enter starvation mode and the request virtual retry queue can be used to remedy the potential deadlock, livelock, or other condition involving the retried request(s). Such retry thresholds can be configurable based on the tolerances of the system (e.g., reflecting how difficult it should be to enter starvation mode), the type of request, the flow control channel or IP block, among other examples.

In one example, entering starvation mode can cause generation of any new requests to be halted. Requests generated prior to starvation mode being triggered by internal starvation logic 325 (e.g., "old entries") can remain queued in the system. All requests that are in retry mode, i.e., that have been or are to be retried based on failures to make forward progress, can be queued in request virtual queue 510. In some implementations, requests can be queued in first-in-first-out (FIFO) order, with the header of the queue initially being the request whose retry triggered the starvation mode. State information can be maintained for requests in the virtual retry queue. In some implementations, state information is only maintained for the header, or top request, in the virtual queue. State information can include, for example, the pipeline, or TOR, identifier (TOR ID) of the request, an identification (e.g., "One Retry") of whether the header request has already been retried (e.g., a binary value), an identification (e.g., "Dep Info") of the dependency determined for the request (e.g., as identified by a code corresponding to one of a set of dependencies), an identification (e.g., "Dep Known") of whether the dependency determined for the request is a known or unknown dependency, an identification (e.g., "Has Info") of whether the dependency has been acquired, an identification (e.g., "Has Conflict") of whether a conflict exists between the virtual queue and another virtual queue (e.g. based on both virtual queue waiting on the same dependency), an identification (in the case of a conflict between virtual retry queues (e.g., when Has Conflict=true) of another request upon which the queued request is dependent, among potentially other information and examples.

State information for requests in the virtual retry queue 510 can be obtained from a variety of sources. Pipeline logic can provide an indication of a reason for a failed request. The particular dependency of the request can be identified from information provided through the pipeline. Dependency information can first be recorded in state information in response to a first failed retry of the header request in the virtual retry queue 510. The dependency information can be obtained in response to the failed retry. After the first retry the OneRetry value can be set to "true" and, if the retry fails to promote forward progress, the DepInfo can be set to a dependency code value corresponding to the dependency identified from the failed retry. This initial retry on the header request can be initiated prior to any dependency information being obtained. In some instances, the initial retry of a header request in a virtual retry queue can effectively be for the purpose of attempting to obtain dependency information for the header request. A TOR ID can also be automatically assigned to a request once it reaches the header position of the retry virtual queue or is first retried after reaching the header position. This can serve to preempt the lack of a TOR ID as a dependency preventing forward progress. In some implementations, each request that obtains the header position can be assigned the same TOR ID. In such instances, the TOR ID can be reused and can be a predefined TOR ID for requests that are in the header position within a respective virtual retry queue, among other examples.

Arbitration or other CHA logic can be used to obtain and detect acquisition of a particular dependency identified in state information 515 as the dependency upon which a header request waits. For instance, a credit of a particular resource can be obtained and retry logic can determine that a dependency identified in state information 515 for the corresponding request (e.g., in a DepInfo field of a header state information table) has been acquired. Upon acquiring the sought-after dependency, retry queue logic can then allow the header request to be retried. In some cases an initial retry can result in forward progress. In other cases, the first retry after acquiring the dependency identified for the header request (e.g., identified from an initial retry of the request when the request obtains the header position of the virtual retry queue) can result in forward progress. In still other instances, only incremental progress can be achieved from a retry following acquisition of an identified dependency of a header request. For instance, multiple dependencies may stand in the way of a request making forward progress and upon retrying the request after acquitting one of the dependencies, the request can again fail and a second dependency can be identified. The dependency of the request, as identified in the state information table 515, can be updated to identify the second dependency. Upon acquiring this different, second dependency, the request can again be retried and so on until forward progress is made.

In some implementations, once a header request of a virtual retry queue makes forward progress, the next request in the virtual queue (e.g., in FIFO order) can assume the header position of the virtual queue. An initial retry can be performed on this new header request to obtain a dependency of the new header request. The dependency can be acquired and the new header request can be retried, and so on, until every request in the virtual retry queue has been correspondingly retried and makes forward progress. When the virtual retry queue has been emptied, a signal can be generated to cause an exit from the starvation mode. The virtual retry queue logic can be suspended and normal operation (e.g., with traditional retry mode) can be resumed to promote forward progress.

As noted above, in some instances, multiple queues (e.g., of multiple flow control classes and/or IP blocks) can compete for the same dependency. When the dependency is obtained, arbitration logic can determine (e.g., using a round robin, rule-based, or other scheme) which of the competing virtual retry queues (e.g., in 520) should be first allowed to retry their respective header request. The virtual retry queue that is granted permission to retry its respective header request may do so, while all other competing header requests (or responses) update their dependencies to identify the retry of the current header request (e.g., by setting a HasConflict value, and setting the ReqDepInfoTorId field to the TOR ID of the header request being retried based on the conflicting dependency). When the header of the virtual retry queue that is being retried gains forward progress, another one of the competing virtual retry queues can be allowed to retry their respective header and so on until all headers of virtual retry queues waiting on the acquired dependency make forward progress.

TOR IDs, or other identifiers can be assigned to every request that has been sent out onto the pipeline. Such identifiers can be assigned, in some implementations, by the destination CHA when it accepts the incoming request. The assignment of a TOR ID (or other identifier) can indicate, in some instances, that the request has obtained forward progress. Such identifiers can be unique to the request while it is in the system. In some implementations, once a TOR ID has been assigned to a request, state information can be maintained for other messages that are to be sent relating to the request. For instance, records of cache or memory may be requested by the CHA receiving the request in an attempt to respond to the sender of the request. Similarly, state information for response messages (e.g., completions) responsive to the request can be maintained. Such messages sent in response to received requests, or in a "response phase" of a transaction, are referred to herein as "response" messages, or simply "responses". "Request" messages, or "requests," on the other hand, correspond to messages involving an initial request in a transaction and when a tracker (e.g., a TOR ID) has not yet been assigned to the message and the transaction. Like requests, responses can themselves be subject to forward progress issues and retries. Accordingly, response virtual retry queues can be maintained, such as shown and described in the example of FIG. 6.

Figure 6:
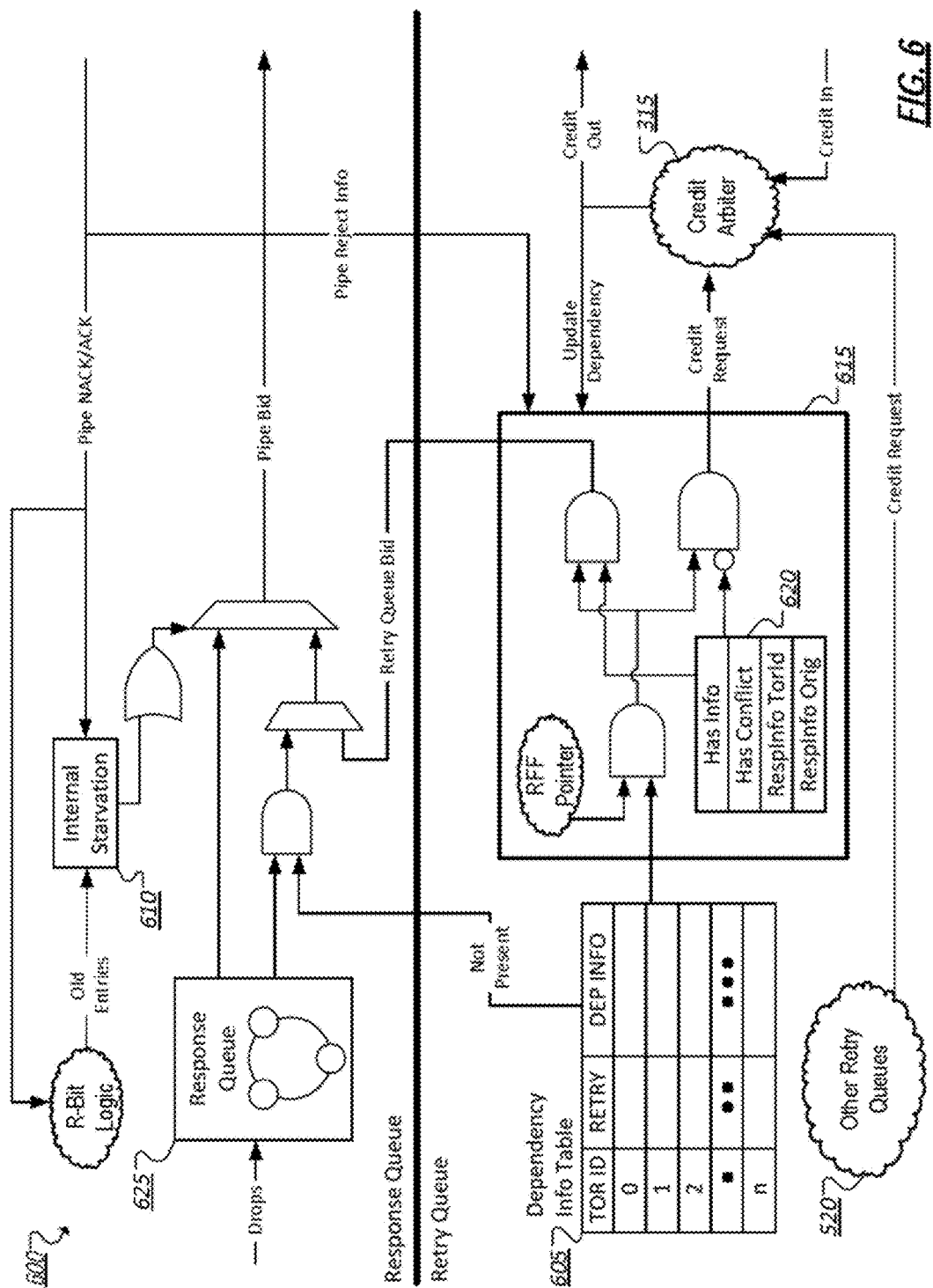
FIG. 6 illustrates a block diagram representing an example response virtual retry queue.

As shown, for instance, in the example illustrated in connection with the simplified block diagram 600 of FIG. 6, response virtual retry queues can be structured and operate differently than request virtual retry queues (e.g., the request virtual retry of the example of FIG. 5). In some implementations, a starvation mode can be triggered, as with requests, for a given response that has been successively retried beyond a predetermined threshold. When starvation mode has been triggered based on the threshold, such as for a particular flow control class of the response, a corresponding virtual retry queue can be activated. In some implementations, state information can be collected and maintained for responses even prior to a starvation mode being triggered. Further, rather than maintaining state information for only the header of a virtual retry queue, state information can be obtained for each response having a TOR ID, among other examples.

In one example implementation, at least some state information can be generated, collected, and maintained for transactions (and their composite requests (i.e., responses)) that have been assigned a TOR ID. This state information can be collected even prior to entering a starvation mode. For instance, a dependency information table 605 can be maintained for responses as responses are retried prior to a starvation mode being triggered, for instance, by internal starvation module 610. Dependency information for responses can be similar to that collected for requests of a request virtual retry queue. For instance, for each TOR ID, dependency information (e.g., 605) can include identification of whether a retry has been performed for one or more responses (e.g., a current response request) of the particular TOR ID. The dependency information can also include an identification of a current dependency (e.g. identified for the TOR ID, for instance, a code of one of a set of known dependencies identified from a most recent retry of a response.

As with request virtual retry queues, retries of responses can be tracked, for instance by internal starvation logic, to identify when one or more responses have been retried beyond an acceptable threshold. When this threshold is met, a starvation mode can be entered and the response virtual retry queue 615 can be activated. In some implementations, queuing of responses can be done on a round robin or other basis, rather than according to a FIFO scheme. For instance, in one example, queuing of responses in starvation mode can be according to dependency type. Dependencies can be prioritized and responses can be retried according to the resources they are dependent on. For instance, as a dependency is acquired, all responses queued in the virtual retry queue having that dependency can be retried. Arbitrating which of two or more responses to retry that have the same dependency can be based on a round robin, response type, FIFO, or other scheme. Response dependencies can include, for example, dependencies involving awaited credits of various coherent link flow control classes and entities, such as a request flow control channel, a response flow control channel, a non-coherent bypass channel, a writeback channel, a non-coherent standard channel, a snoop broadcast channel, a local home agent credit, among other examples.

Additional dependency information can be maintained for responses for use during starvation mode. For instance, dependency information 620 can include HasInfo, HasConflict, and RespInfoTorID values, similar to those maintained in request virtual retry queues. Other values can also be maintained for responses to be retried, such as a RespInfoOrig value (e.g., associated with the corresponding entry in the response retry queue), among other examples. In some instances, this information 620 can be maintained for all TOR IDs irrespective of whether starvation mode is triggered or not. In other instances, some dependency information (e.g., 605) can be maintained at all times for active responses assigned a TOR ID, while other information (e.g., 615) is first collected when starvation mode is triggered, among other potential examples.

As with request virtual retry queues, a response virtual retry queue can halt retries during starvation mode until corresponding dependencies are acquired. Virtual retry queue logic can also attempt to acquire dependencies identified for responses in the queue (e.g., as identified in dependency information 605). As dependencies are acquired, all queued responses awaiting that particular dependency can be retried. In some cases, the retries will result in forward progress for responses, in others incremental progress will result in the identification of an additional dependency impeding forward progress of the response. Dependency updates can be performed as new or updated dependency information is obtained for the TOR IDs. Further, conflicts between a response virtual retry queue (e.g., 615) and other virtual retry queues (e.g., 520) can also be identified and arbitrated by the system, as with request virtual retry queues. Further, starvation mode can be maintained until the virtual retry queue is cleared, at which point control is returned to response queue 625. In some examples, response queue 625 can queue according to a round robin or other scheme.

Figure 7:
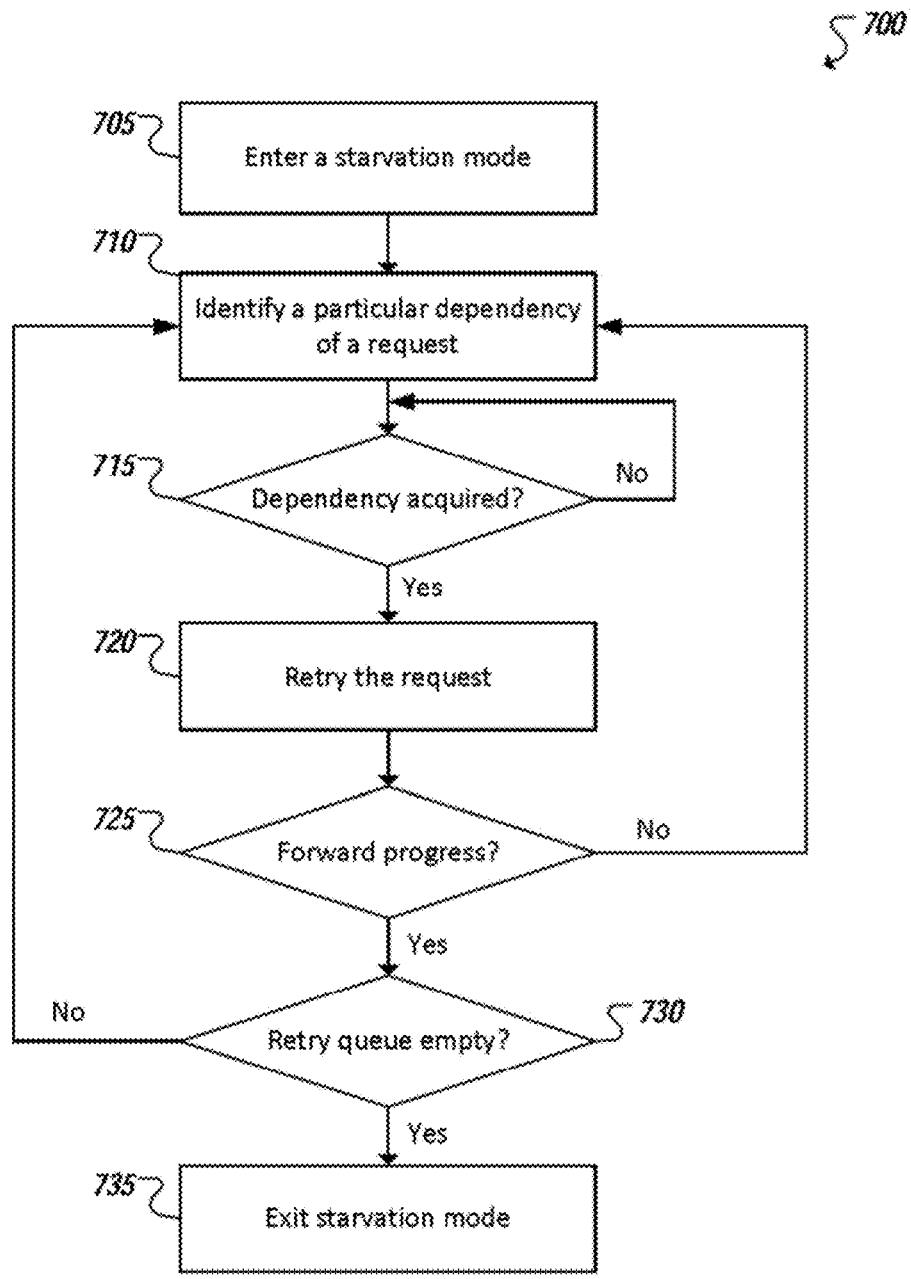
FIG. 7 illustrates a flowchart representing example techniques for use of a virtual retry queue.

Turning now to the simplified flowchart 700 of FIG. 7, example techniques are illustrated in connection with virtual retry queues, according to some example implementations. For instance, starvation mode can be entered 705 for a queue of a particular CHA of an IP block. The queue can correspond to a particular one of multiple different flow control classes. Starvation mode can be entered 705 based on a detected number of retries of a particular request (or response) meeting or exceeding a threshold. A particular dependency can be identified 710 for a request. In some cases, dependencies can be identified 710 for requests in the queue. In some instances, a dependency is identified for a lead, or header, request in the queue and only after starvation mode is entered. Dependencies can be identified for requests one at a time as the requests ascend to the top of the queue. In other instances, such as for a response retry queue, dependencies can be identified and tracked for all dependencies prior to and after starvation mode is entered 705.

With dependencies identified 710 for one or more requests in the retry queue, the dependencies can be attempted to be acquired. For instance, a credit can be requested for a resource upon which the request is dependent. Data can be received identifying that a dependency has been acquired or resolved. For instance, data can be received that identifies that the credit has been granted, that another request has been retried, that another block accessing a resource has released the resource, etc. Acquisition of the dependency can be monitored 715. When the dependency for a request is acquired the request can be retried 720. In some cases, multiple requests (e.g., responses) waiting on the same dependency can be retried based on acquisition of the dependency.

Following a retry 720 of a request, it can be assessed whether the request made forward progress or not (at 725). In some cases, upon resolving the dependency that had previously impeded forward progress, the retry will result in successful completion or submission of the request. In other cases, forward progress may still be stalled by virtue of additional dependencies. If forward progress does not result for the request from the retry, another dependency can be identified 710, in some cases, from information obtained from the retry. This second dependency can be acquired (at 715) and the request can be retried again 720, with this sequence being repeated until forward progress is made. If forward progress is made, successfully retried request(s) can be dropped from the retry queue. If the retry queue is empty following the successful retries, starvation mode can be exited 735 and control can be passed from a retry queue to a standard queue. If additional requests remain, the dependencies of those requests can be identified 710 (to the extent that have not) and the dependencies can be acquired 715. Once the dependencies have been acquired 715, the outstanding request(s) can be retried 720 until forward progress has been established for all of the requests in the retry queue.

Note that the apparatus', methods', and systems described above may be implemented in any electronic device or system as aforementioned. As specific illustrations, the examples below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 8:
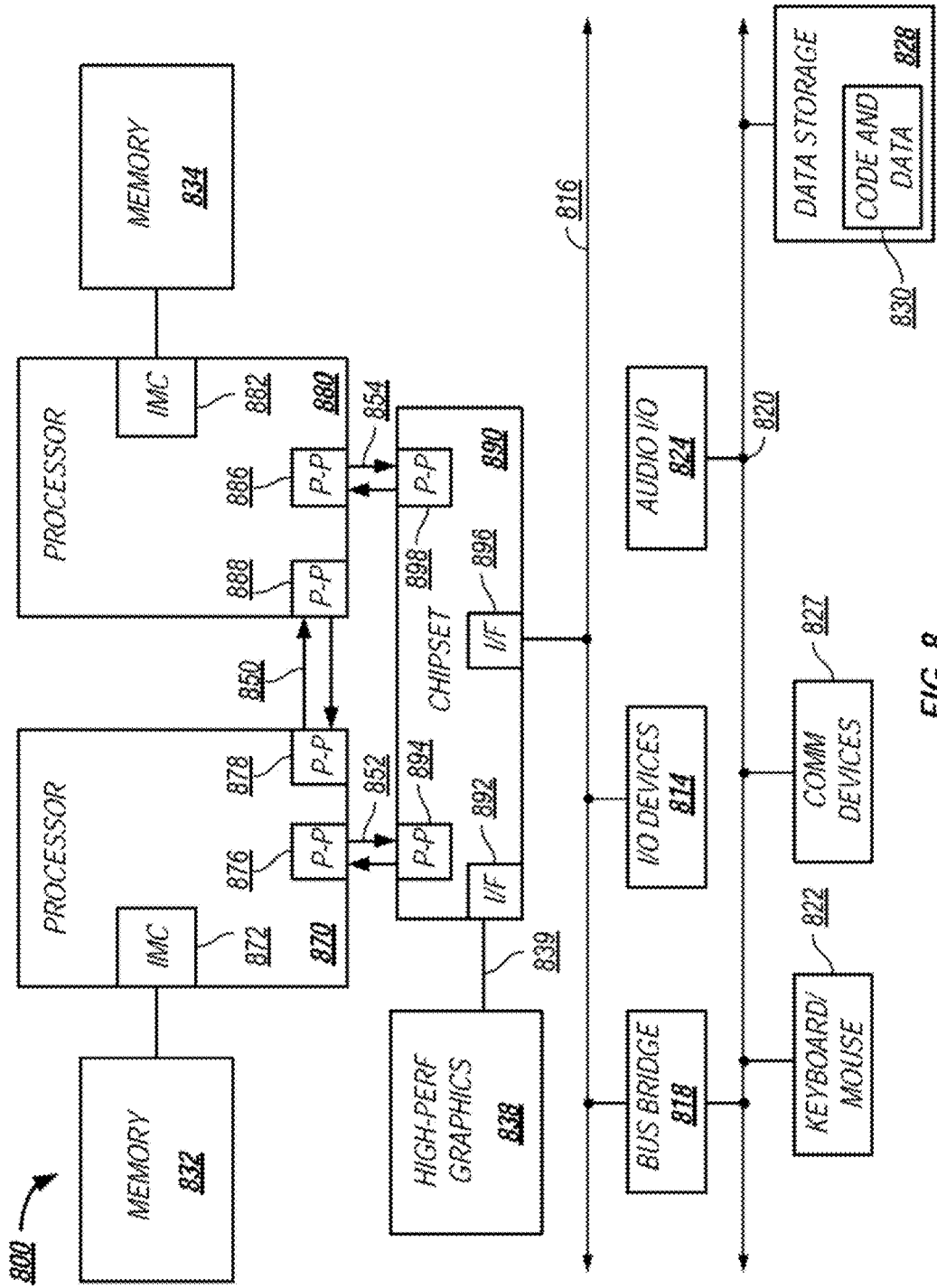
FIG. 8 illustrates another embodiment of a block diagram for a computing system.

Referring now to FIG. 8, shown is a block diagram of a second system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of a processor. In one embodiment, 852 and 854 are part of a serial, point-to-point coherent interconnect fabric, such as Intel's Quick Path Interconnect (QPI) architecture. As a result, the invention may be implemented within the QPI architecture.

While shown with only two processors 870, 880, it is to be understood that the scope of the present invention is not so limited. In other embodiments, one or more additional processors may be present in a given processor.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 each exchange information with a chipset 890 via individual P-P interfaces 852, 854 using point to point interface circuits 876, 894, 886, 898. Chipset 890 also exchanges information with a high-performance graphics circuit 838 via an interface circuit 892 along a high-performance graphics interconnect 839.

A shared cache (not shown) may be included in either processor or outside of both processors; yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O) interconnect bus, although the scope of the present invention is not so limited.

As shown in FIG. 8, various I/O devices 814 are coupled to first bus 816, along with a bus bridge 818 which couples first bus 816 to a second bus 820. In one embodiment, second bus 820 includes a low pin count (LPC) bus. Various devices are coupled to second bus 820 including, for example, a keyboard and/or mouse 822, communication devices 827 and a storage unit 828 such as a disk drive or other mass storage device which often includes instructions/code and data 830, in one embodiment. Further, an audio I/O 824 is shown coupled to second bus 820. Note that other architectures are possible, where the included components and interconnect architectures vary. For example, instead of the point-to-point architecture of FIG. 8, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the micro-controller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1110 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, hardware- and/or software-based logic, and a method to enter a starvation mode, identify a particular dependency of a first request in a retry queue, determine that the particular dependency is acquired, and retry the first request based on acquisition of the particular dependency.

In at least one example, logic is implemented at least in part in hardware circuitry.

In at least one example, starvation mode is to be entered for a particular one of a plurality of flow control classes and a retry queue is provided for each of the plurality of flow control classes.

In at least one example, the first request comprises an initial request of a transaction and the first request can be designated as a header request of the retry queue.

In at least one example, requests in the retry queue are ordered in a first-in-first-out (FIFO) order.

In at least one example, it can be determined that forward progress is achieved through the retry of the first request, a second request in the plurality of requests can be designated as the header request of the retry queue, the second request following the first request in the FIFO order. A dependency of the second request can be identified, it can be determined that the dependency of the second request is acquired, and the second request can be retried based on acquisition of the dependency of the second request.

In at least one example, the dependency of the second request is different from the particular dependency.

In at least one example, the first request corresponds to a response to be generated to a received request.

In at least one example, the retry queue is to be ordered based at least in part on dependency type.

In at least one example, the first request is one of a plurality of requests in the retry queue and it can be determined that the particular dependency applies to a second one of the plurality of requests and the second request can be retried based on acquisition of the particular dependency.

In at least one example, the first request is assigned a unique identifier prior to the entry into starvation mode.

In at least one example, the dependency is acquired from dependency information received from a pipeline over which first request is to be sent.

In at least one example, the dependency information is received in association with a retry of the first request.

In at least one example, the first request is added to the retry queue for a failure to make forward progress.

In at least one example, it can be identified that the first request continues to fail to make forward progress from the retry and another dependency can be identified based on the retry, where the first request is to be retried again after the other dependency is acquired.

In at least one example, a conflict between the retry queue and another retry queue can be identified, where the conflict includes a conflict between a retry of a particular request in the other retry queue with the retry of the first request based at least in part on the dependency.

In at least one example, the retry queue comprises a virtual retry queue and the virtual retry queue points to a standard queue.

In at least one example, the virtual retry queue is activated during the starvation mode.

In at least one example, dependency information can be maintained for the first request, where the dependency information includes one or more of an identification of whether the first request has been retried during the starvation mode, an identification of the particular dependency, an identification of whether the particular dependency has been acquired, and an identification of whether a conflict exits with another retry queue.

In at least one example, dependency information is only maintained for the header request of the retry queue.

In at least one example, dependency information is maintained for each request in the retry queue.

In at least one example, an amount of retries of the first request can be determined and it can be determined that the amount of retries exceeds a threshold amount.

The starvation mode can be entered based on determining that the amount of retries exceeds a threshold amount.

In at least one example, new requests are to be dropped during the starvation mode.

In at least one example, the starvation mode is to be exited when the retry queue is empty.

In at least one example, the particular dependency can be attempted to be acquired.

In at least one example, a system can be provided that includes a first device and a second device communicatively coupled to the first device using a point-to-point serial interconnect. The second device can include logic to enter a starvation mode, designate a first request to be sent to the first device from the second device as a header request of a retry queue, identify a particular dependency of the first request, determine that the particular dependency is acquired, and retry the first request based on acquisition of the particular dependency. In some examples, the first device includes a first one of a plurality of intellectual property (IP) blocks and the second device includes a second one of the plurality of IP blocks. In some examples, the second device maintains a plurality of retry queues associated with a plurality of flow control classes. In some examples, the plurality of retry queues includes at least one request virtual retry queue and at least one response virtual retry queue.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a computing system block comprising logic implemented at least in part in hardware circuitry, wherein the logic is to:
enter a starvation mode based on a determination that one or more particular requests in one or more retry queues of the computing system block fail to make forward progress, wherein the starvation mode blocks the one or more retry queues and activates one or more virtual retry queues for the one or more particular requests, each of the one or more virtual retry queues comprises a respective table of pointers to entries in one or more of the retry queues, the virtual retry queues are to be used for retries during the starvation mode instead of the retry queues, and ordering of retries defined in at least one of the virtual retry queues is different from ordering of retries defined in a corresponding one of the one or more retry queues;
identify in a particular one of the virtual retry queues, a particular dependency of a first one of the particular requests, wherein the first request is in a particular one of the one or more retry queues;
determine that the particular dependency is acquired; and
retry the first request during the starvation mode based on acquisition of the particular dependency, wherein the first request is retried before another request ahead of the first request in the particular retry queue.

2. The apparatus of claim 1, wherein starvation mode is to be entered for a particular one of a plurality of flow control classes and a respective one of the one or more virtual retry queues is provided for each of the plurality of flow control classes.

3. The apparatus of claim 1, wherein the first request comprises an initial request of a transaction, and the logic is to designate the first request as a header request of the virtual retry queue.

4. The apparatus of claim 3, wherein requests in the virtual retry queue are ordered in a first-in-first-out (FIFO) order.

5. The apparatus of claim 4, wherein the logic is further to:
determine that forward progress is achieved through the retry of the first request;
designate a second request in the plurality of requests as the header request of the virtual retry queue, wherein the second request follows the first request in the FIFO order;
identify a dependency of the second request;
determine that the dependency of the second request is acquired; and
retry the second request based on acquisition of the dependency of the second request.

6. The apparatus of claim 5, wherein the dependency of the second request is different from the particular dependency.

7. The apparatus of claim 1, wherein the first request corresponds to a response to be generated to a received request.

8. The apparatus of claim 7, wherein the virtual retry queue is to be order based at least in part on dependency type.

9. The apparatus of claim 8, wherein the first request is one of a plurality of requests in the virtual retry queue and the logic is further to:
determine that the particular dependency applies to a second one of the plurality of requests; and
retry the second request based on acquisition of the particular dependency.

10. The apparatus of claim 7, wherein the first request is assigned a unique identifier prior to the entry into starvation mode.

11. The apparatus of claim 1, wherein the logic is to acquire the dependency from dependency information received from a pipeline over which the first request is to be sent and the dependency information is to be maintained in the particular virtual retry queue.

12. The apparatus of claim 11, wherein the dependency information is received in association with a retry of the first request.

13. The apparatus of claim 1, wherein the first request is added to the virtual retry queue for a failure to make forward progress.

14. The apparatus of claim 13, wherein the logic is further to:
identify that the first request continues to fail to make forward progress from the retry; and
identify another dependency based on the retry, wherein the first request is to be retried again after the other dependency is acquired.

15. The apparatus of claim 13, wherein the virtual retry queue comprises a particular one of the one or more virtual retry queues and the logic is further to identify a conflict between the particular retry queue and another one of the one or more virtual retry queues, wherein the conflict comprises a conflict between a retry of a particular request in the other retry queue with the retry of the first request based at least in part on the dependency.

16. A method comprising:
detecting that at least a first request in a particular retry queue fails to make forward progress;
entering a starvation mode, wherein the starvation mode blocks the particular retry queue and activates a virtual retry queue for at least the first request, the virtual retry queue comprises a table of pointers to entries in the particular retry queue, the virtual retry queue is to be used for retries during the starvation mode instead of the particular retry queue, and ordering of retries defined in the virtual retry queue is different from ordering of retries defined in the particular retry queue;
designating a first request as a header request of the virtual retry queue;
identifying, in the virtual retry queue, a particular dependency of the first request;
determining that the particular dependency is acquired during the starvation mode;
retrying the first request during the starvation mode based on acquisition of the particular dependency; and
exiting the starvation mode.

17. The method of claim 16, further comprising maintaining dependency information for the first request, wherein the dependency information includes one or more of an identification of whether the first request has been retried during the starvation mode, an identification of the particular dependency, an identification of whether the particular dependency has been acquired, and an identification of whether a conflict exits with another virtual retry queue.

18. The method of claim 17, wherein dependency information is only maintained for the header request of the virtual retry queue.

19. The method of claim 17, wherein dependency information is maintained for each request in the virtual retry queue.

20. The method of claim 17, further comprising:
determining an amount of retries of the first request;
determining that the amount of retries exceeds a threshold amount, wherein starvation mode is entered based on determining that the amount of retries exceeds a threshold amount.

21. At least one non-transitory machine accessible storage medium having code stored thereon, the code when executed on a machine, causes the machine to:
determine that at least a first request in a particular retry queue fails to make forward progress;
enter a starvation mode, wherein the starvation mode blocks the particular retry queue and activates a virtual retry queue for at least the first request, the virtual retry queue comprises a table of pointers to entries in the particular retry queue, the virtual retry queue is to be used for retries during the starvation mode instead of the particular retry queue, and ordering of retries defined in the virtual retry queue is different from ordering of retries defined in the particular retry queue;
designate the first request as a header request of the virtual retry queue;
identify, in the virtual retry queue, a particular dependency of the first request;
determine that the particular dependency is acquired; and
retry the first request during the starvation mode based on acquisition of the particular dependency.

22. The storage medium of claim 21, wherein new requests are to be dropped during the starvation mode.

23. The storage medium of claim 21, wherein the starvation mode is to be exited when the virtual retry queue is empty.

24. The storage medium of claim 21, wherein the code when executed further causes a machine to attempt to acquire the particular dependency.

25. A system comprising:

a first device;

a second device, wherein the second device is communicatively coupled to the first device using a point-to-point serial interconnect, and the second device comprises logic to:

determine that at least a first request in a particular retry queue fails to make forward progress;

enter a starvation mode, wherein the starvation mode blocks the particular retry queue and activates a virtual retry queue for at least the first request, the virtual retry queue comprises a table of pointers to entries in the particular retry queue, the virtual retry queue is to be used for retries during the starvation mode instead of the particular retry queue, and ordering of retries defined in the virtual retry queue is different from ordering of retries defined in the particular retry queue;

designate the first request to be sent to the first device from the second device as a header request of the virtual retry queue;

identify, in the virtual retry queue, a particular dependency of the first request;

determine that the particular dependency is acquired; and retry the first request during the starvation mode based on acquisition of the particular dependency.

26. The system of claim 25, wherein the first device comprises a first one of a plurality of intellectual property (IP) blocks and the second device comprises a second one of the plurality of IP blocks.

27. The system of claim 25, wherein the second device maintains a plurality of virtual retry queues associated with a plurality of flow control classes.

28. The system of claim 27, wherein the plurality of virtual retry queues comprises at least one request virtual retry queue and at least one response virtual retry queue.

* * * * *